Figure 5:
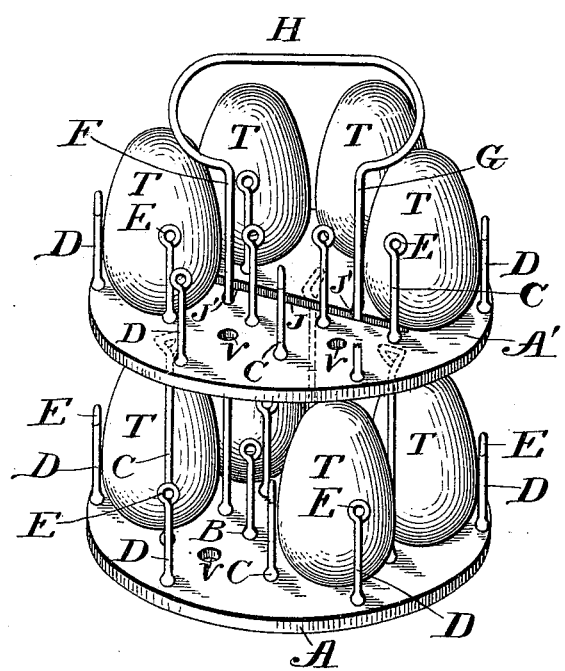

No. 620,044. Patented Feb. 21, 1899.
H. J. MARKS.
EGG HOLDER FOR BOILING EGGS.
(Application filed Nov. 25, 1898.)
(No Model.) 2 Sheets—Sheet 1.
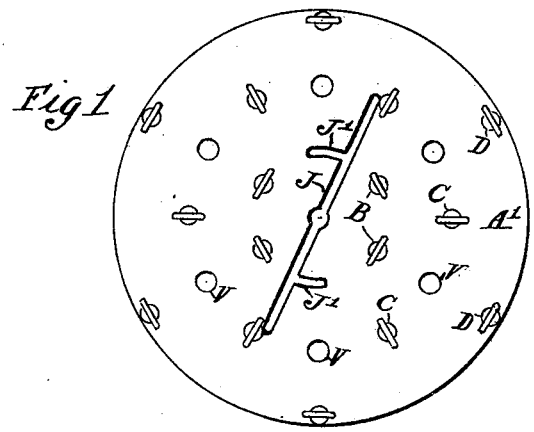
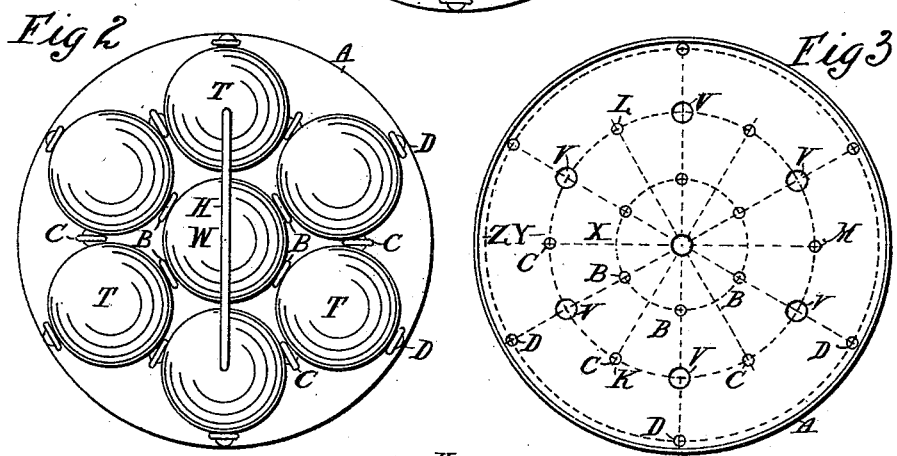
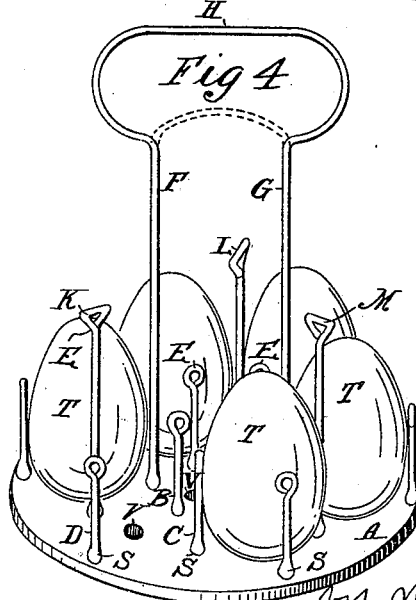
Witnesses:
C. A. Bateman
Percy C. Bowen
Inventor:
Henry J. Marks,
by Wilkinson & Fisher
Attorneys.

No. 620,044. Patented Feb. 21, 1899.
H. J. MARKS.
EGG HOLDER FOR BOILING EGGS.
(Application filed Nov. 25, 1898.)

(No Model.) 2 Sheets—Sheet 2.

UNITED STATES PATENT OFFICE.

HENRY JAMES MARKS, OF TOOWOOMBA, QUEENSLAND.

EGG-HOLDER FOR BOILING EGGS.

SPECIFICATION forming part of Letters Patent No. 620,044, dated February 21, 1899.

Application filed November 25, 1898. Serial No. 697,416. (No model.)

*To all whom it may concern:*

Be it known that I, HENRY JAMES MARKS, a subject of the Queen of the United Kingdom of Great Britain and Ireland, residing at Toowoomba, in the Colony of Queensland, have invented a certain new and useful Improved Egg-Holder for Use both in Boiling Eggs and as a Stand; and I do hereby declare the following to be a full, clear, and exact description of the invention, such as will enable others skilled in the art to which it appertains to make and use the same.

The object of my invention is to provide an article of manufacture cheap enough for general use to serve as a holder by which a number of eggs may be retained in place not only while being boiled, but also afterward—as, for example, on a breakfast-table.

The holder is so devised as to hold each egg firmly yet safely, to take up a minimum of space in the pot, to be durable yet simple in construction and also attractive to the eye, and to facilitate, if desired, the boiling of some of the eggs harder than the rest and the separation of the hard-boiled from the soft-boiled in a natural way, so as to avoid confusion and mixture.

The egg-holder is illustrated in the attached drawings, in which—

Figure 1 shows a movable upper tier of the holder in plan view. Fig. 2 shows a plan of the holder filled with eggs, the upper tier being removed. Fig. 3 shows a diagrammatic plan of the arrangement of the dividing-pins, handles, and holes for drainage and other purposes. Fig. 4 is a perspective view of the holder, showing five eggs on the base-tier, which is capable of containing seven eggs; and Fig. 5 is a perspective view of the holder complete, with the upper tier in position.

Like parts bear the same letters of reference in all the figures.

The base tier is composed of a circular plate of metal A, having three series B C D of egg-dividing pins affixed to it at regular distances apart upon respective concentric circles X, Y, and Z. The smallest circle is large enough to inclose one egg W, while the pins of all three circles coöperate to form spaces (the centers of which are marked V) to hold in place a ring of eggs T around the central egg W, there being four pins bounding each egg of such ring. Fig. 2 shows how very closely the eggs may be packed, but such closeness is not essential. The heads of the pins are enlarged and rendered devoid of projecting points, as shown by E, so that there is no tendency to injure the eggs. The dividing-pins may be of wire, either light and flexible at their heads or rigid.

The plate A is designed to rest near the bottom of the boiler or pot when the eggs are being boiled, and holes (oval ones being preferred) in the plate, as at V, are useful to allow free circulation of water and to allow the latter to drain off when the holder is removed from the pot. Where the plate A fits the pot circumferentially, holes of some kind are necessary. The upper tier (there may be any number thereof) is a plate A', adapted to hold as many eggs as the lower tier, there being the same circles of egg-dividing pins as in the base tier. There are, however, fewer pins—*i. e.*, two are absent, their place being occupied by the lengthening of two of the inner-circle pins on plate A. These lengthened pins are carried up high, as shown by F G, and may be joined or otherwise suitably arranged at the top so as to form a handle H. The plate A' is slitted, as shown by J, to enable it to pass over handle H, means being provided, if necessary, to hold the plate A' securely when in use, such as slits J', which engage the pins F G. If the handle were shaped as dotted in Fig. 4, there would be no need of slits J'. The slitting will of course vary according to the handle. As the plate A', with its eggs, may easily be removed from the pot without removing the rest of the holder, it will be easy to provide both hard and soft boiled eggs. One or more plates A' will easily go into a pot and allow the lid of the pot to be put on. One of the said plates may be stood upon any ordinary dish upon the breakfast-table. The arrangement of the pins aforesaid is such as to protect the eggs from breakage, there being no exposed points, while even if the egg-holder were held at a considerable angle to the vertical the eggs would not fall out. The plate A' does not rest upon the eggs in the lower tier, but upon the heads E of three or more of the pins C, which are lengthened for that purpose—for example, the pins at the points K, L, and M in Fig. 3 and seen lengthened in Fig. 4. Of course other equivalent means to support plate A' might be employed in lieu of those above specified.

It is intended to use material which will not be affected by boiling water in carrying out this invention, and the handles are preferably made collapsible in any well-known way or removable for packing purposes. Where the extreme of cheapness is aimed at consistent with good appearance, solder and holes at the points S may be the medium of attachment of the egg-dividing pins to the plates, the lower ends of the pins being enlarged, rivet fashion.

Having now described this invention, what I claim is—

1. In an egg-holder, the combination, with a base-plate; of a series of dividing-pins projecting above the surface of the base and arranged in a series of concentric circles about the center thereof but in alternating radii throughout the series, one pair of such pins, located at opposite points in the same circle, extending above all the other pins and being united in the form of a bail, substantially as described.

2. In an egg-holder, the combination with a base-plate; a series of dividing-pins of unequal length projecting above the surface of the base-plate, and arranged in series of concentric circles about the center thereof, but in alternating radii throughout the series, three or more of said pins being of a uniform length greater than the length of an egg for supporting a removable tray; one pair of pins extending above all the others and being united in the form of a bail; of a removable tray slotted radially for the passage of said bail, and provided with a series of pins similar to the base-plate, the said tray, when fitted over said bail being adapted to rest upon the supporting-pins referred to, substantially as described.

In testimony whereof I affix my signature in presence of two witnesses.

HENRY JAMES MARKS.

Witnesses:
C. W. HAMILTON,
R. D. MACKINTON.